United States Patent
Hanusiak et al.

(10) Patent No.: US 9,753,721 B2
(45) Date of Patent: Sep. 5, 2017

(54) AGILE SOFTWARE DEVELOPMENT PROCESS AND RESULTS

(71) Applicant: International Business Machines Corporation, Armonk, NY (US)

(72) Inventors: Tomasz Hanusiak, Czarny Dunajec (PL); Michal Klak, Zielonki (PL); Konrad K. Skibski, Zielonki (PL); Tomasz Zaras, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 62 days.

(21) Appl. No.: 14/736,361

(22) Filed: Jun. 11, 2015

(65) Prior Publication Data

US 2016/0098269 A1   Apr. 7, 2016

(30) Foreign Application Priority Data

Oct. 7, 2014   (GB) .................................. 1417661.4

(51) Int. Cl.
*G06F 9/44*    (2006.01)
*G06F 11/36*   (2006.01)
(Continued)

(52) U.S. Cl.
CPC ............ *G06F 8/71* (2013.01); *G06F 9/44536* (2013.01); *G06F 9/54* (2013.01); *G06F 11/3664* (2013.01); *G06F 9/45533* (2013.01)

(58) Field of Classification Search
CPC ............... G06F 8/71; G06F 2009/4557; G06F 9/44536; G06F 9/45508; G06F 9/45533; G06F 9/45558; G06F 9/54
(Continued)

(56) References Cited

U.S. PATENT DOCUMENTS 8,701,078 B1   4/2014  Holler et al.
8,739,047 B1   5/2014  Holler et al.
(Continued)

OTHER PUBLICATIONS

Hadar et al., "Less is More: Architecture Documentation for Agile Development," The 6th International Workshop on Cooperative and Human Aspects of Software Engineering (CHASE), 2013, pp. 121-124, © 2013 IEEE.*

(Continued)

*Primary Examiner* — Wei Zhen
*Assistant Examiner* — Mohammed Huda
(74) *Attorney, Agent, or Firm* — Nolan M. Lawrence

(57) ABSTRACT

A method for agile software development comprises receiving by a VM a command by a first version of a software component running on a first virtual machine, wherein the command may be executed by the software component, passing the command to a hypervisor along with an output file including a functionality identifier corresponding to the command and identifiers for versions of the software component to which the command is applicable, and transferring the command to a second VM for an execution of the functionality if the identifier of the second version of the software component was included in the output file. Additionally, the method may include sending a freeze command by the hypervisor to the second virtual machine if the identifier of the second version of the software component is not included in the output file.

13 Claims, 5 Drawing Sheets

(51) Int. Cl.
*G06F 9/54* (2006.01)
*G06F 9/445* (2006.01)
*G06F 9/455* (2006.01)

(58) Field of Classification Search
USPC ........ 717/101, 120, 170; 715/221, 222, 224, 715/225, 733, 759
See application file for complete search history.

(56) References Cited

U.S. PATENT DOCUMENTS

| | | | |
|---|---|---|---|
| 8,739,113 | B2 | 5/2014 | Packbier et al. |
| 2003/0005107 | A1* | 1/2003 | Dulberg .................. G06F 9/54 709/223 |
| 2009/0319580 | A1 | 12/2009 | Lorenz et al. |
| 2012/0079449 | A1 | 3/2012 | Sanderson et al. |
| 2012/0260250 | A1* | 10/2012 | Maeda .................. G06F 21/53 718/1 |
| 2012/0324435 | A1* | 12/2012 | Somani .................. G06F 8/30 717/170 |
| 2013/0091170 | A1 | 4/2013 | Zhang et al. |
| 2013/0332900 | A1 | 12/2013 | Berg et al. |
| 2013/0339932 | A1 | 12/2013 | Holler et al. |
| 2014/0115557 | A1 | 4/2014 | Holler et al. |

OTHER PUBLICATIONS

Hadar et al., "Less is More: Architecture Documentation for Agile Development," The 6th International Workshop on Cooperative and Human Aspects of Software Engineering (CHASE), 2013, pp. 121-124, © 2013 IEEE. DOI: 10.1109/CHASE.2013.6614746.
Unknown, "Iterations Management," Screenshot Gallery, agilewrap, pp. 1-2, copyright © 2011 WoodRanch Technology, Inc., http://www.agilewrap.com/screenshotgallery_iteration_mgt.html.
GB Application 1417661.4, entitled "Agile Software Development Process and Results," filed Oct. 7, 2014.
U.S. Appl. No. 14/864,366, entitled: "Agile Software Development Process and Results," filed Sep. 24, 2015.
List of IBM Patents or Patent Applications Treated as Related, Signed Sep. 23, 2015, 2 pages.

* cited by examiner

AGILE SOFTWARE DEVELOPMENT PROCESS AND RESULTS

BACKGROUND

This disclosure relates generally to a method for agile software development. The disclosure relates further to a system for agile software development, a computing system, a data processing program, and a computer program product.

The main idea behind agile software development may be to divide the development process into short iterations and be able to demonstrate intermediate results to end users right after each of the software development iteration steps. Having received the feedback of the users, the development process for a software component may continue, be modified or, may be dropped completely. Although such an approach seems to be a perfect solution, it may cause some problems and also entail challenges which mainly occur because people involved in the software development may be too busy and suffer from constant lack of time. Therefore, they do not have enough time to read related documentation or keep track of all amendments introduced to the software being developed. In addition, their expectations in regards to the newly developed software components are typically very high: have everything served simple and be able to test/try it out without any additional effort. Due at least in part to its flexibility, it offers many benefits to software providers as well as to the users, who wait on use a new software product to use.

SUMMARY

Embodiments of this disclosure provide a method, system, and computer program product for agile software development, according to various embodiments.

According to one aspect, a method for agile software development may be provided. The method for agile software development may comprise receiving a command by a first version of a software component running on a first virtual machine. The command may be received via the first virtual machine and may be executed by the first version of the software component. The method may further comprise passing the command from the first virtual machine to a hypervisor along with an output file comprising a functionality identifier corresponding to the command and identifiers for versions of the software component to which the command may be applicable. Additionally, the method may comprise transferring the command by the hypervisor to a second virtual machine for an execution of the functionality corresponding to the command by a second version of the software component if the identifier of the second version of the software component was comprised in the output file. The method may also comprise sending a freeze command by the hypervisor to the second virtual machine if the identifier of the second version of the software component is not comprised in the output file.

According to another aspect, a system for agile software development may be provided. The system may comprise a receiving unit adapted for receiving a command to a first version of a software component running on a first virtual machine. The command may be receivable via the first virtual machine and executable by the first version of the software component. The system may also comprise a passing unit adapted for passing the command from the first virtual machine to a hypervisor along with an output file comprising a functionality identifier corresponding to the command and identifiers for versions of the software component to which the command may be applicable. And, the system may comprise a transferring unit adapted for sending the command by the hypervisor to a second virtual machine for an execution of the functionality corresponding to the command by a second version of the software component if the identifier of the second version of the software component was comprised in the output file. Moreover, the system may comprise a freezing unit adapted for sending a freeze command by the hypervisor to the second virtual machine if the identifier of the second version of the software component may not be comprised in the output file.

It may be noted that a user may enter the command to the first version of a software component via user interface, both running in a virtual machine.

It may be noted that the second version of the software component may be executed in/on the second virtual machine.

BRIEF DESCRIPTION OF THE DRAWINGS

Preferred embodiments of the invention will now be described, by way of example only, and with reference to the following drawings.

Like reference numbers and designations in the various drawings indicate like elements.

DETAILED DESCRIPTION

Figure 1:
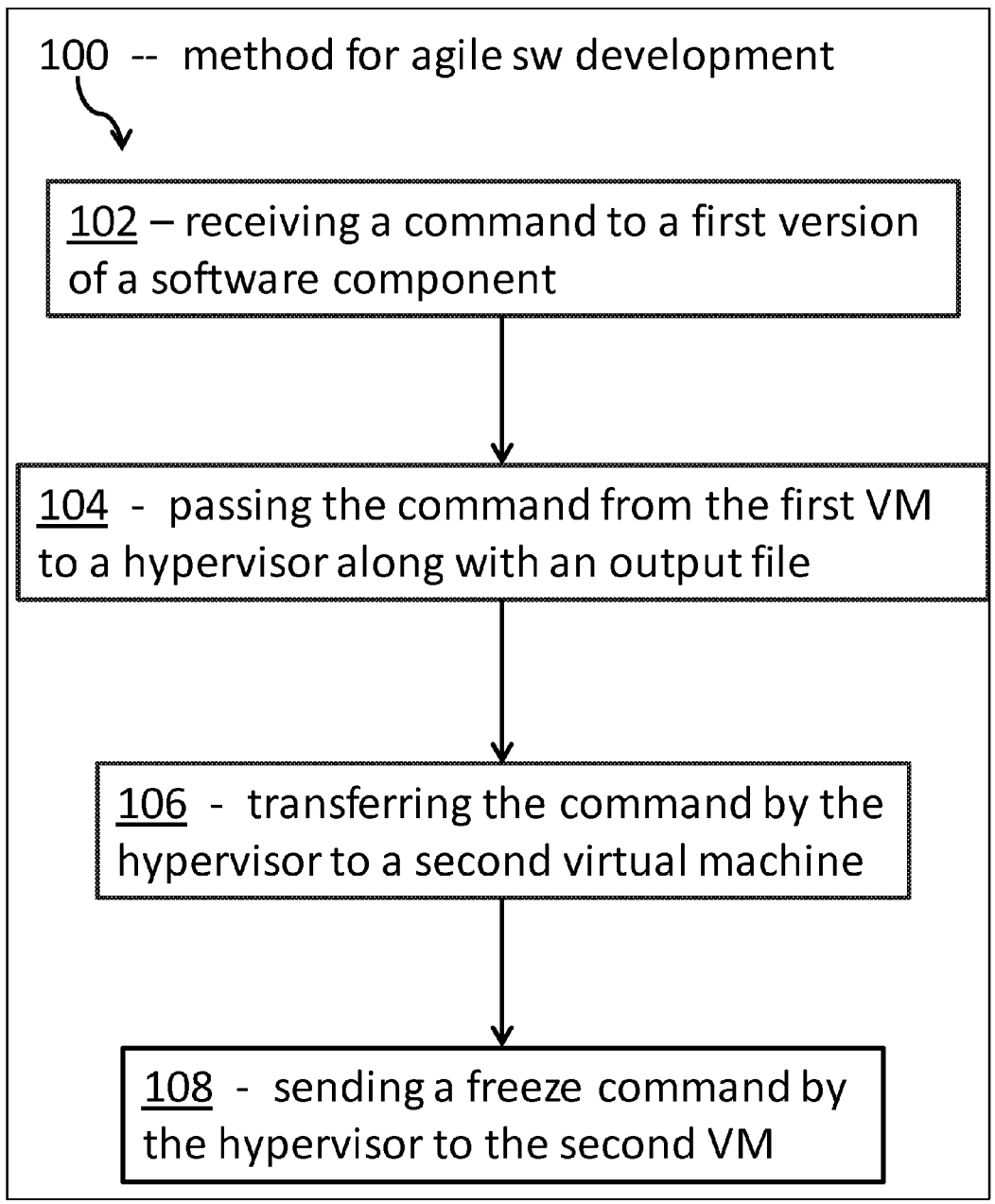
FIG. 1 shows a block diagram of an embodiment of a method for agile development.

It may also be noted that the command may be received from a user, in particular via a user input.

It may also be understood that a software component may be understood as software under development having source code or code components, e.g., lines of code, and a corresponding executable image.

In the context of this description, the following conventions, terms and/or expressions may be used:

The term "software development", in particular "agile software development", may denote a group of software development methods and procedures in which requirements and solutions evolve through a collaboration between self-organizing, cross-functional teams of software developers, testers and users. It promotes adaptive planning, evolutionary development, early delivery, continuous improvement and encourages rapid and flexible response to change. It is a conceptual framework that focuses on delivering working software with the minimum amount of work. The Agile Manifesto, which first laid out the underlying concepts of agile development, introduced the term in 2001. The manifest was revised in 2010. The software development process may be supported using a software development tool or software development environment.

The term "command" may denote a user input to a software component. The command may be an entered string or a click of a pointing device, e.g., a computer mouse. Commands may also be entered or received using other input devices such as microphones using voice recognition, trackballs or the like.

The term "first version"—in particular a first version of a software component—may denote a first iteration of a software component. Typically, software components are developed in different iteration steps, each having different stages of maturity of available features and/or functions. A first version may differentiate on features and/or functions from a second version of a software component. Although features may be different, the software component may still be the same having more—or less—a slightly different source code line.

The term "software component" may denote a function on a computer implemented as a software program, program functions or subroutine. The software component may be implemented in the form of a source code which may be compiled or interpreted. The software component may be related to a single feature/function, a group of features/functions or it may be a complete software application comprising a plurality of features/functions. The software component may be executed as a stand-alone component or as part of a larger framework.

The term "virtual machine" may denote an emulation of a particular computer system. A virtual machine—or, in short "VM"—may be operated based on the computer architecture and functions of a real or hypothetical computer. Their implementations may involve specialized hardware, software, or a combination of both. Classification of virtual machines may be based on the degree to which they implement functionality of targeted real machines. That way, system virtual machines (also known as full virtualization VMs) provide a complete substitute for the targeted real machine and a level of functionality required for the execution of a complete operating system. On the other hand, process virtual machines are designed to execute a single computer program by providing an abstracted and platform-independent program execution environment. In the context of this disclosure, it does not matter which kind of virtual machine may be used.

The term "hypervisor"—also known as virtual machine monitor (VMM)—may denote a piece of computer software, firmware or hardware that may create and run virtual machines. A computer on which a hypervisor is running one or more virtual machines is defined as a host machine. Each virtual machine may be called a guest machine. The hypervisor presents the guest operating systems with a virtual operating platform and may manage the execution of the guest operating systems. Multiple instances of a variety of operating systems may share the virtualized hardware resources. Software components may be executed under the control of a guest operating system on a hypervisor. The first software component and the second software component may be executed using different instance of VMs.

The term "functionality identifier" may denote a tag indicating a specific functionality of a software component. There may be a one-to-one relationship between a specific functionality and a related functionality identifier. A functionality may also be denoted as feature of function of a software component.

The term "freeze command" may denote a signal instructing a virtual machine to stop execution under the control of a hypervisor. Consequently, if the execution of the virtual machine stops software elements, i.e., software components, running on the virtual machine may also stop execution.

The term "user facing element" may denote a fragment of a user interface of a software component which may be rendered on a display for an interaction with a user or an input device operated by the user. The user facing element may be, e.g., one or more input fields, rendered content, check-boxes for selection, radio buttons, or any other interactive element.

The term "agile development library" may denote a repository comprising different elements of a software development process. This may comprise information about a specific version of a developed software component, related source code of the software component, input and output parameters, requirements to operating environments like virtual machines, and specifications or other operating parameters, e.g., required libraries, etc. The agile development library may also comprise identifiers for specific functions of specific software components. Those functional identifiers may for example indicate the compatibility or applicability of a specific function to a specific version of a software component. Such functionality identifiers may be understood as a processing reference between functions, features and related software components and their versions. Also, the output file may be comprised in the agile development library. The agile development library may be understood as a repository underlying a software development tool for agile software development.

Users typically face a series of challenges in agile development programs. Users or testers should work with the latest version only or maintain multiple environments—each for a specific version. The first approach requires very strict timing from users to provide accurate feedback and there is no chance to have insights into the past versions. The second approach is quite difficult to handle and very irritating to use because it may require a navigating back and forth between different computing environments.

Users testing the latest release may have difficulties in recognizing what has been introduced since the last version of a software component or between particular versions, which may make it complicated to focus only on the modifications and also to track the progress.

Users who are able to test the newest version of a software component may not be able to see the previous versions for comparison, to be able to better judge which version may be better, especially when a particular feature was deeply refactored or some parallel solutions were introduced.

There are several disclosures relating to a method for agile software development.

U.S. Pat. No. 8,739,113 B2 discloses a method of synchronizing a plurality of software development teams. Each team is working on a subset of a code development project. A repository comprising a code base of the code development project is provided in each team's assigned subset and is correlated with every other team's assigned subset within the code development project.

Document US 2014/0115557 A1 discloses a computer-implemented method of managing work items associated with agile software development. The method includes displaying the first group of incomplete work items associated with the current iteration of an agile software development project. In response to a first user input, a first incomplete work item of the first group is transferred from the current iteration to a subsequent iteration on the agile software development project.

However, there may be a need to further enhance the ability of users to interact with software developers and different versions of developed software components. Software developers and users may have a need to work side-by-side comparing and testing different versions of developed software components.

The proposed method for agile software development may offer a couple of advantages:

Firstly, software developers, testers and users may get better insight into different versions of developed software components. The different versions of the software component having different functions/features may be displayed on a computer screen for direct interaction by a software developer. In parallel, a specific version of a software component may be selected interactively and a user facing element—e.g., a part of the user interface of the software component—may also be displayed. Thus, the user may interactively experience different implementations of features and functions within a software component while, at the same time, a software developer may see the related source code lines on the same screen in a different window; also two different displays may be used. This may allow a much more interactive development process, involving a software developer and a user at the same time. This may result in time savings in the development process and better code quality.

Software developers and users may select user facing elements of different versions of the software component and try different related functionalities. Hence, the method may allow for an easy depiction of differences between several versions of the same software component, i.e., agile iteration final outputs. The method may increase transparency in the software development process and may allow users to navigate between the environments (VMs) of different software components transparently upon request.

The implementation based on the agile software development library may allow interpreting static tags in the source code of the software components—which may be added to the source code by software developers—and may perform particular actions based on them, in particular notify users about changes in functionality of software components.

In one embodiment, users may vote for different additional functionalities for a specific software component. Such an additional feature of the software development environment may be implemented using the agile development library.

In a further embodiment of the method, users may also receive indications if a new function may have been implemented as part of the software component. The necessary data for such an active information component—e.g., a user identifier, a software component identifier and a feature identifier—may also be stored in the agile development library.

According to one embodiment of the method, each version of the software component may be deployed on a separate virtual machine. This may allow that more than just the first and second version of the software component may be deployed. A plurality of similar software components with comparable functionality within different versions may run in parallel on two different virtual machines. This way, it may be possible to switch between the different software components running on the related virtual machines and compare and/or test their respective functionality. Different versions of the software component may not influence each other because they are running on different virtual machines.

According to a further embodiment of the method, source code components—in particular lines of code—of the different versions of the software component may be rendered in parallel on a display, in particular in different display windows or on different screens. Thus, a side-by-side test of the difference of the components may be performed while the software components may not influence each other.

According to a further enhanced embodiment of the method, a user facing element—in particular one or more elements of a user interface—corresponding to a selected version of the software may also be rendered in parallel—in particular, in parallel to the source code components of the different versions of the software component on the display. It may also be possible that user facing elements of different software components—in particular different versions of the same component—may be rendered on a computer display in parallel.

In one embodiment of the method, an agile development library may comprise at least the source code of the first and second version of the software component, the output file, and configuration settings of the first and the second virtual machine. This way, relevant development parameters, components and software environment information may be combined in one central place. For a software development environment such an agile development library may be instrumental to fulfill requests of developers, testers and end-users. The agile development library may also comprise information about features and/or functions of the software component planned for future versions.

According to a further enhanced embodiment, an implementation of the method may also comprise generating a signal—in particular a signal to a user of a current version of a software component—if a new version of the software component may be available for test. A runtime component of a related software development environment may notify a user about the availability of the new version if the user—e.g., a test user—may actually use the current version of the software component.

Additionally, one embodiment of the method may comprise that during an execution of a version of the software component—in particular a current, actual or regular production version of the software component—may generate a signal—resulting in a notification and/or in form of a displayed message to a user—indicating planned new features of future versions of the software component. It may be one or a plurality of different features. Also information about the new and/or changed functions may be displayed to the user on demand.

An even more enhanced embodiment of the method may also comprise receiving a preference signal—in particular a voting of a user—for at least one feature out of the planned features. This may allow a prioritization of planned additional features of future functions and features of the software component. Input of the user community of the developed software components may influence the software development process directly.

According to a more sophisticated embodiment method, an on-demand transition—in particular triggered by a user, based on a signal—e.g., by a click of a computer mouse—to a future version of the software component may be provided. The transition may also be performed to a related complete application of the software component, if a new test version of the related software component may be available for test. This may involve a transition from one virtual machine running one version of the software component to another virtual machine running another version of the software component.

Accordingly, in a more advanced embodiment of the method, an alert to a source of the preference signal—in particular the voting of a user for a specific feature—may be generated for a planned feature if the feature out of the planned features may be implemented in a future version of the software component. The source of the preference signal may be the user or his representation in the computer system having voted for this feature. Such an alert may be used to notify the user having voted for the feature that the feature may have been implemented. The user may then decide to test the new version by transitioning to the new software component or application on a different VM. Also a textual description of the function may be displayable on demand of the user.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present disclosure are apparent from the examples of embodiments to be described hereinafter and are explained with reference to the examples of embodiments, but to which the invention is not limited.

In the following, a detailed description of the figures will be given. All instructions in the figures are schematic. Firstly, a block diagram of an embodiment of the disclosed method for agile software development is given. Afterwards, further embodiments of the system for agile software development will be described.

FIG. 1 shows a block diagram of an embodiment of a method for agile software development. The method 100 may comprise receiving, 102, a command to a first version of a software component running on a first virtual machine, wherein the command may be received via the first virtual machine, e.g., via I/O routines of the VM, and may be executed by the first software component. The method 100 may also comprise passing, 104, the command from the first virtual machine to a hypervisor along with an output file comprising a functionality identifier corresponding to the command and identifiers for versions of the software component to which the command is applicable, in particular compatible. The method may also comprise transferring, 106, the command by the hypervisor to a second virtual machine for an execution of the functionality corresponding to the command by a second version of the software component if the identifier of the second version of the software component was comprised in the output file.

Finally, the method may comprise sending, 108, a freeze command by the hypervisor to the second virtual machine—and thus to the second version of the software component—if the identifier of the second version of the software component is not comprised in the output file.

Figure 2:
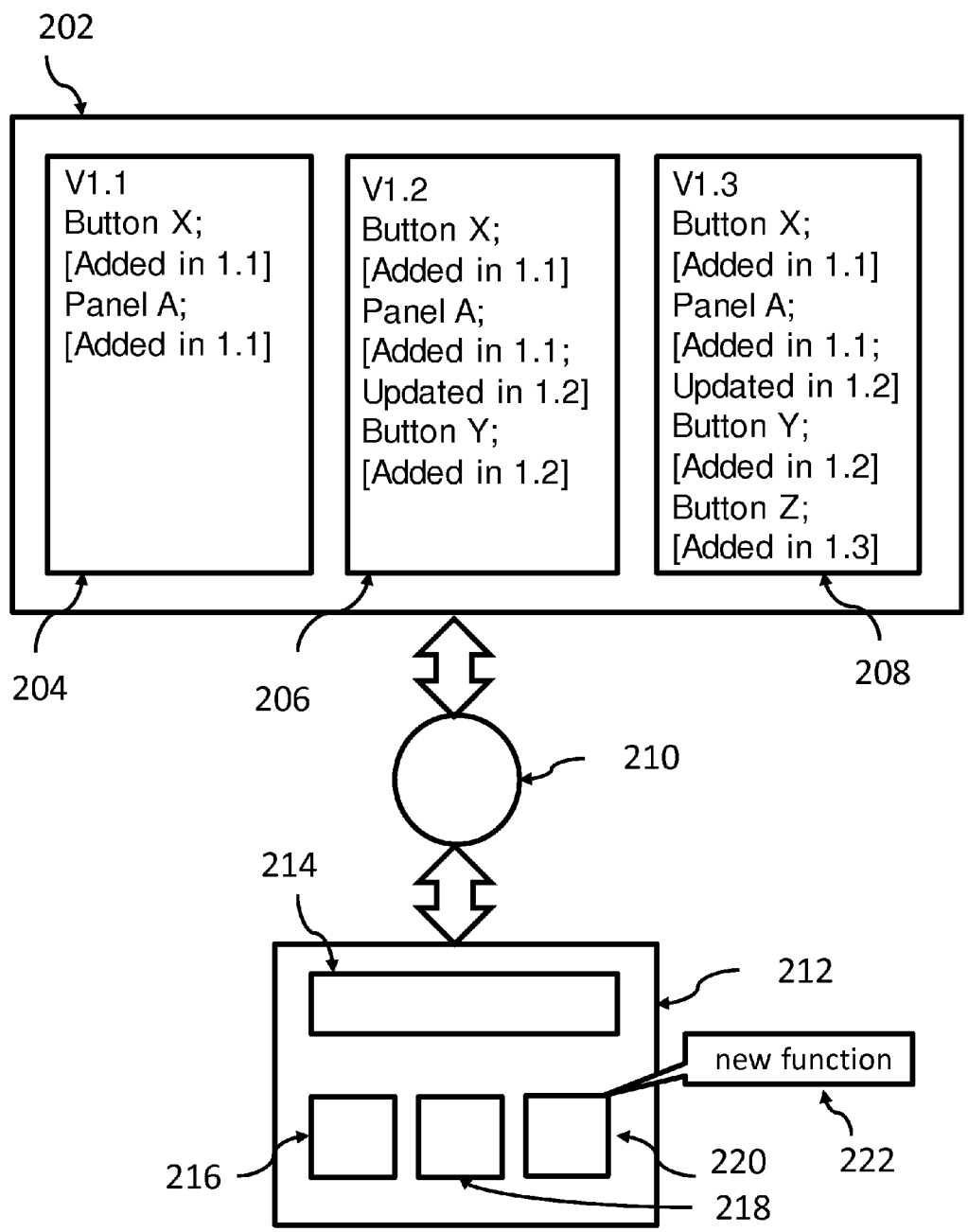
FIG. 2 shows a block diagram of an embodiment of several components involved in the method.

FIG. 2 shows a block diagram of an embodiment of several components involved in the method. A hypervisor 202 may allow deploying, e.g., three different versions 204, 206, 208 of a software component. The reference numerals 204, 206, 208 may show how the different application or software component source code—in particular version 1.1, version 1.2 and version 1.3—of the software component may look like and how their source code may have evolved over time. A component of the hypervisor 202 may manage all software component versions selectable for comparison. A user may select which version he wants to see. Thus, not all available versions may have to be rendered on a computer screen. Less or more than three versions—as in the current example—may be available.

Version 1.3 having reference numeral 208, may be selected. A corresponding user facing element 212, i.e., user interface, may also be displayed. The different versions of the software component 204, 206, 208 may be displayed on the same computer screen 612. Alternatively, the source code of the different versions of the software component 204, 206, 208 and the related user interface elements 212 may be displayed on separate computer screens.

If the user wishes to follow the history of changes to the functionality of the source code, the agile development library 210 connects with a hypervisor and after checking available versions and function identifiers the user may have permission to navigate to previous releases and its functionalities available in a different version of the user interface 210. The agile development library may collect and store details about the changes to the software component over time, starting with the first version, were the given functionality was present, consecutive changes like milestone, as well as minor changes, reasons for the changes as well as the requestor, the creator of the change, and so on. This may allow a user as well as a tester to understand the reason behind the changes and compare modification across all available versions starting from the point were given features were introduced. Examples of modification tags are shown in the form of symbols 204, 206, 208: "added in 1.1", added in 1.2", etc. V1.3 may be regarded as the current production version of the software component. Thus, V1.1 and V1.2 may be earlier released or versions of the software component.

The agile development library interfaces to both, the user interface 212, as well as to the hypervisor 202 as indicated by the two vertical double arrows.

The user may also receive indications about the new version, like on the message window 222. He may also be given the option to display more information about the new UI (user interface) component 220. Such information may also be comprised in the agile development library 210.

Figure 3:
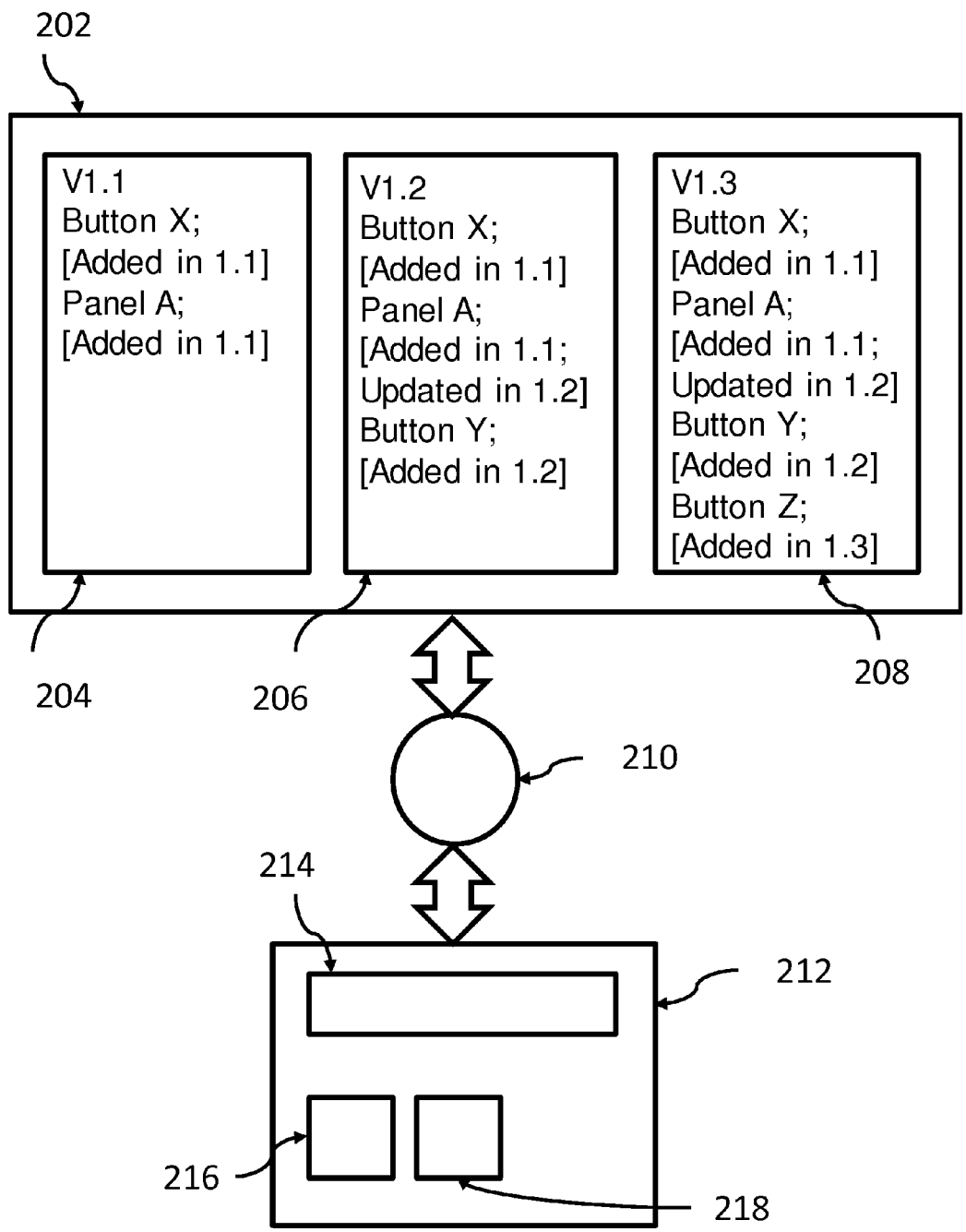
FIG. 3 shows a block diagram of an interaction with an earlier version of the software component, according to various embodiments.

FIG. 3 shows a block diagram of an interaction with an earlier version of the software component, here V1.1 or V1.2. The reference numerals correspond to FIG. 2. Here, the user may have chosen to see the functionality of version 1.2, 206. The user interface 212 does no longer show the button 220, but only button 216 and 218 in addition to an exemplary output field 214.

Additionally, a user may decide to render two (or more) application versions in parallel, e.g., V.1.2 and V1.3 in different windows of a user interface. This may allow a user to visually recognize different response times of different algorithms in the different versions of the software component, e.g., a sorting algorithm underlying related versions of source code.

Figure 4:
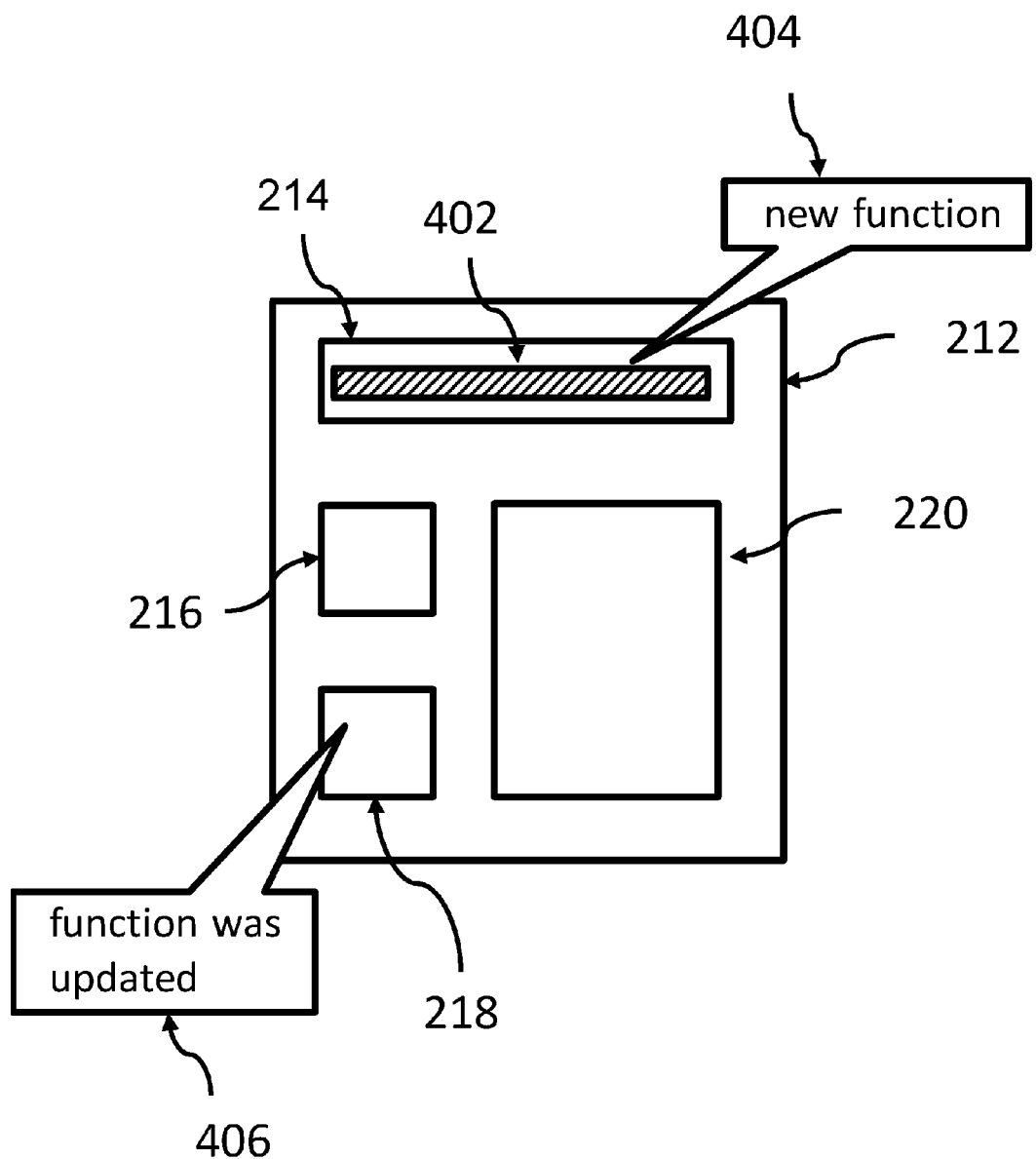
FIG. 4 shows a block diagram of a changed user interface belonging to a future version of the software, according to various embodiments.

FIG. 4 shows a block diagram of a changed UI 212 belonging to a future version of the software component 208. Assuming that a user/tester is working with the actual production version 1.3, 208 of the software component, he may be notified that a new function may be available for the software component. Such a new function may be shown as new output box 402. An additional pop-up message 404 may instruct the user that a new functionality has been added to the UI 212. He may also request more information about the new function to be displayed (not shown). It may also be noted that the arrangement of input fields 216, 218, 220 and the output field 214 in the UI 212 may have been modified.

The user may also be informed by a message 406 that button 218 or its appearance may be changed in a future version, e.g. version 1.4 or later, of the software component. However, such a function may not yet be available for testing.

Additionally, the user may request more information about the future changed and additional functionality related to button 218. There may be more planned changes for other UI or user facing elements. The user may then switch to an option menu being able to vote for one or the other planned future feature.

Figure 5:
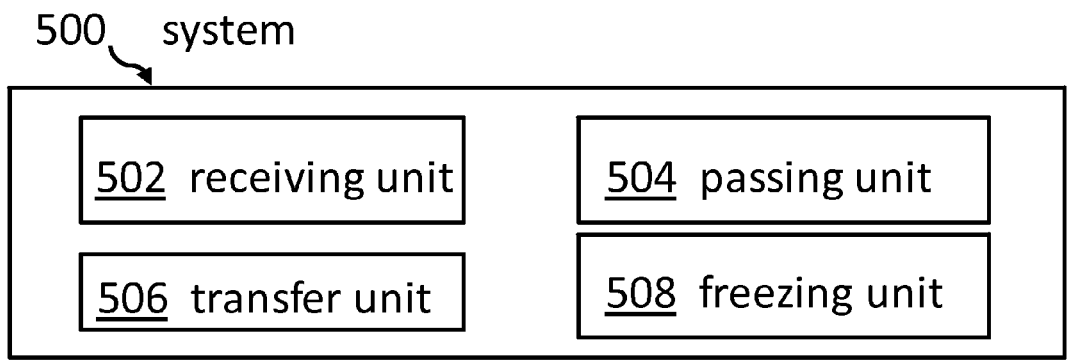
FIG. 5 shows a block diagram of a system for agile software development, according to various embodiments.

FIG. 5 shows a block diagram of a system 500 for agile software development. The system 500 may comprise an entering unit 502 adapted for entering a command to a first version of a software component running on a first virtual machine, in particular running on a hypervisor (not shown), which in turn may be executed on a physical hardware (not shown).

The command is receivable via the first virtual machine, in particular via input/output routines of the VM and the command may be executable by the software component.

The system may further comprise a transferring unit 504 adapted for passing the command from the first virtual machine to a hypervisor along with an output file comprising a functionality identifier corresponding to the command and identifiers for versions of the software component to which the command is applicable or compatible with.

A sending unit 506 is adapted for sending the command by the hypervisor to a second virtual machine for an execution of the functionality corresponding to the command by a second version of the software component if the identifier of the second version of the software component was comprised in the output file.

A freezing unit 508 is adapted for sending a freeze command by the hypervisor to the second virtual machine if the identifier of the second version of the software component is not comprised in the output file. This may ensure that incompatible functions and versions of the software component may not be executed together.

It may be noted that the proposed solution may be based either on a single environment or on a set of virtualized environments managed by a hypervisor. The elements of the solutions comprise the following:

A code layer may comprise a tagging mechanism of functions, procedures, commands, visual elements, and so on. This way, it may be always known which part of the software component has been created/modified in which iteration based on the duration tags. These iteration tags represent the most granular element of the solution and may be integrated into the source code of the software component of the development.

In a presentation layer a user may choose which version of software the method/system for agile software development should treat as a base version; all elements developed prior to the base version may be presented accordingly to a chosen graphical scheme, e.g., greyed out, blinking, in a different—e.g., smaller—font size, in a different color scheme using different font style, commented, and so on.

Depending on the approach, the user may get informed about the history of certain functionality of the software component and he may have the ability to view the previous implementations.

Using an infrastructure layer, the system may communicate with the hypervisor and may perform actions of all environments in parallel (if applicable and in-line with the output file comprising the functionality identifier). Based on the software development library, the software code may be interpreted and changes to the development environment are controlled upon request of the user.

Figure 6:
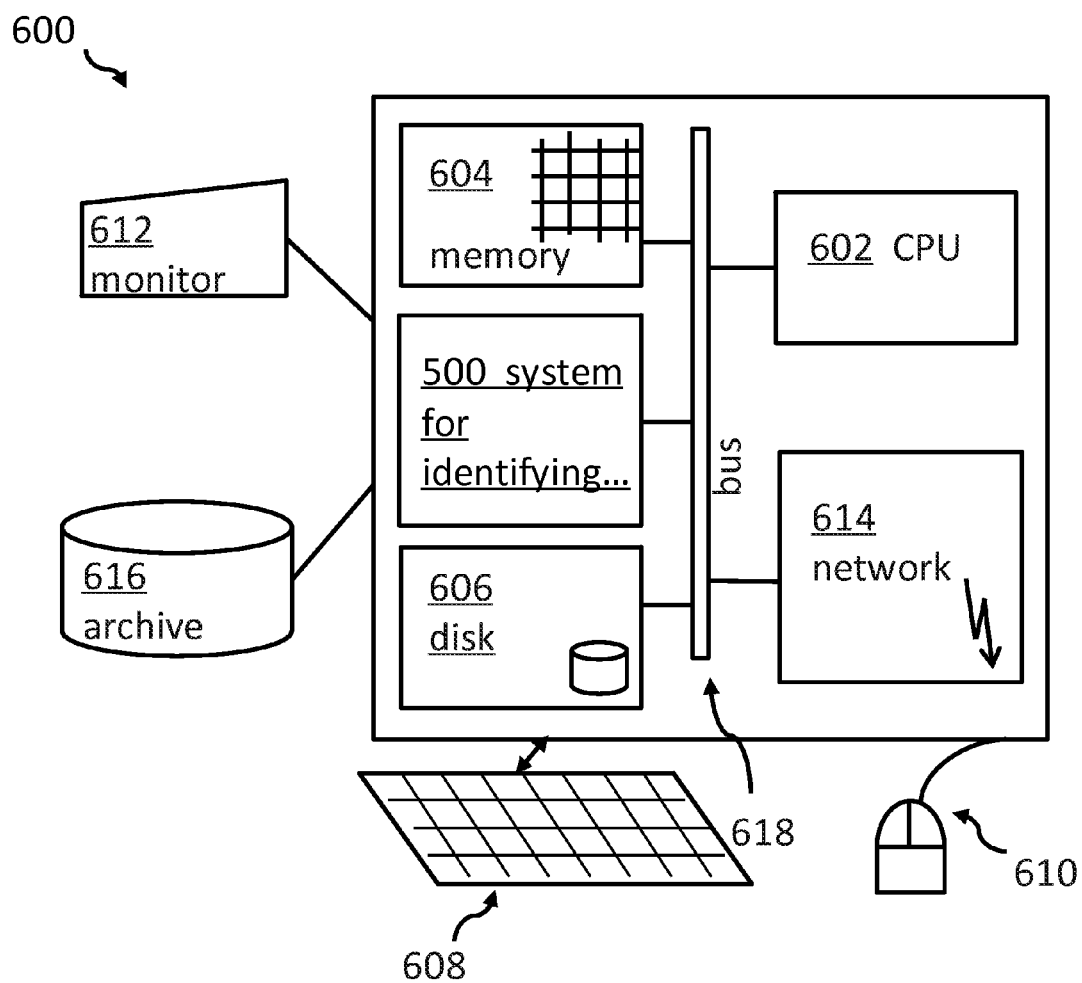
FIG. 6 shows an embodiment of a computing system comprising the system for agile software development.

Embodiments may be implemented together with virtually any type of computer, regardless of the platform being suitable for storing and/or executing program code. For example, as shown in FIG. 6, a computing system 600 may include one or more processor(s) 602 with one or more cores per processor, associated memory elements 604, an internal storage device 606 (e.g., a hard disk, an optical drive, such as a compact disk drive or digital video disk (DVD) drive, a flash memory stick, a solid-state disk, etc.), and numerous other elements and functionalities, typical of today's computers (not shown). The memory elements 604 may include a main memory, e.g., a random access memory (RAM), employed during actual execution of the program code, and a cache memory, which may provide temporary storage of at least some program code and/or data in order to reduce the number of times, code and/or data must be retrieved from a long-term storage medium or external bulk storage 616 for an execution. Elements inside the computer 600 may be linked together by means of a bus system 618 with corresponding adapters. Additionally, the system 500 for agile software development may be attached to the bus system 618.

The computing system 600 may also include input means such as a keyboard 608, a pointing device such as a mouse 610, or a microphone (not shown). Alternatively, the computing system may be equipped with a touch sensitive screen as main input device. Furthermore, the computer 600, may include output means such as a monitor or screen 612 [e.g., a liquid crystal display (LCD), a plasma display, a light emitting diode display (LED), or cathode ray tube (CRT) monitor]. The computer system 600 may be connected to a network [e.g., a local area network (LAN), a wide area network (WAN)], such as the Internet or any other similar type of network, including wireless networks via a network interface connection 614. This may allow a coupling to other computer systems, or a storage network, or a tape drive. Those, skilled in the art will appreciate that many different types of computer systems exist, and the aforementioned input and output means may take other forms. Generally speaking, the computer system 600 may include at least the minimal processing, input and/or output means, necessary to practice various embodiments.

While the invention has been described with respect to a limited number of embodiments, those skilled in the art, having benefit of this disclosure, will appreciate that other embodiments may be devised, which do not depart from the scope of the invention, as disclosed herein. Accordingly, the scope of the invention should be limited only by the attached claims. Also, elements described in association with different embodiments may be combined. It should also be noted that reference signs in the claims should not be construed as limiting elements.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store, a program for use, by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions, which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions, which execute on the computer or other programmable apparatus, provide processes for implementing the functions/acts specified in the flowchart and/or block diagram, block, or blocks.

The block diagrams in the Figures illustrate the architecture, functionality, and operation of possible implementations of systems, methods and computer program products, according to various embodiments. In this regard, each block in the block diagrams may represent a module, segment, or portion of code, which comprises one or more executable instructions for implementing the specified logical function(s). It should also be noted that, in some alternative implementations, the functions, discussed hereinabove, may occur out of the disclosed order. For example, two functions taught in succession may, in fact, be executed substantially concurrently, or the functions may sometimes be executed in the reverse order depending upon the functionality involved. It will also be noted that each block of the block diagrams, and combinations of blocks in the block diagrams, may be implemented by special purpose hardware-based systems that perform the specified functions or acts, or combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiment was chosen and described in order to best explain the principles of the invention and the practical application, and to enable others of ordinary skills in the art to understand the invention for various embodiments with various modifications, as are suited to the particular use contemplated.

What is claims is:

1. A system, comprising:
   a memory;
   a processor communicatively coupled to the memory, the processor configured to provide resources to one or more virtual machines (VM)s; and
   a hypervisor, the hypervisor running on the processor, the hypervisor configured to manage execution of one or more VMs, the hypervisor executing a first VM that is running one or more software components including a first version of a software component, the hypervisor executing a second VM that is running one or more software components including a second version of the software component, the hypervisor configured to:
   send a command to the first version of the software component, wherein the command is receivable via the first VM and executable by the first version of the software component;
   receive from the first VM an output file comprising version identifiers, the version identifiers correspond to versions of the software component to which the command is applicable; and
   send, in response to the second version identifier being present in the output file, the command to the second version of the software component, wherein the command is receivable via the second VM and executable by the second version of the software component, and wherein the execution of the second version of the software component is parallel to execution of the first version of the software component.

2. The system of claim 1, wherein the different versions of the software component contain source code components, and wherein the source code components are rendered in parallel on a display.

3. The system of claim 2, wherein a user-facing element corresponding to a selected version of the software component is also rendered in parallel on the display.

4. The system of claim 1, further comprising:
   during an execution of a version of the software component, generating a signal indicating planned features of future versions of the software component,
   receiving a preference signal for at least one feature out of the planned features, and
   generating an alert to a source of the preference signal for a planned feature if the feature out of the planned features is implemented in a future version of the software component.

5. The system of claim 1, wherein a third VM that is running one or more software components including a third version of the software component is being executed by the hypervisor, and wherein the hypervisor is further configured to:
   send, in response to a third version identifier not being present in the output file, a freezing command to the third VM, the freezing command causing the third VM stop running the third version of the software component.

6. The system of claim 1, wherein the command is from a user via a user interface.

7. A computer program product for processing data, the computer program product comprising a computer readable storage medium having program code embodied therewith, the program code comprising computer readable program code configured to:
   receive a command by a first version of a software component running on a first virtual machine, wherein the command is received via the first virtual machine and executed by the first version of the software component,
   pass the command from the first virtual machine to a hypervisor along with an output file comprising a functionality identifier corresponding to the command and identifiers for versions of the software component to which the command is applicable,
   transfer the command by the hypervisor to a second virtual machine for an execution of the functionality corresponding to the command by a second version of the software component if the identifier of the second version of the software component was comprised in the output file, and
   send a freeze command by the hypervisor to the second virtual machine if the identifier of the second version of the software component is not comprised in the output file.

8. The program product of claim 7, wherein the different versions of the software component contain source code components, and wherein the source code components are rendered in parallel on a display.

9. The program product of claim 8, wherein a user-facing element corresponding to a selected version of the software component is also rendered in parallel on the display.

10. The program product of claim 7, wherein the program code comprising computer readable program code is further configured to:
    during an execution of a version of the software component, generate a signal indicating planned features of future versions of the software component,
    receive a preference signal for at least one feature out of the planned features, and generate an alert to a source of the preference signal for a planned feature if the feature out of the planned features is implemented in a future version of the software component.

11. A system, comprising:
    a memory;
    a processor communicatively coupled to the memory, the processor configured to provide resources to one or more virtual machines (VM)s; and
    a hypervisor, the hypervisor running on the processor, the hypervisor configured to manage execution of one or more VMs, the hypervisor executing a first VM that is running one or more software components including a first version of a software component, the hypervisor executing a second VM that is running one or more software components including a second version of the software component, the hypervisor configured to:
- send a command to the first version of the software component, wherein the command is receivable via the first VM and executable by the first version of the software component;
- receive from the first VM an output file comprising version identifiers, the version identifiers correspond to versions of the software component to which the command is applicable; and
- send, in response to a second version identifier not being present in the output file, a freezing command to the second VM, the freezing command causing the second VM stop running the second version of the software component.

12. The system of claim 11, wherein a third VM that is running one or more software components including a third version of the software component is being executed by the hypervisor, and wherein the hypervisor is further configured to:
- send, in response to a third version identifier being present in the output file, the command to the third version of the software component, wherein the command is receivable via the third VM and executable by the third version of the software component, and wherein the execution of the third version of the software component is parallel to execution of the first version of the software component.

13. The system of claim 11, wherein the command is from a user via a user interface.

* * * * *